No. 752,849. Patented February 23, 1904.

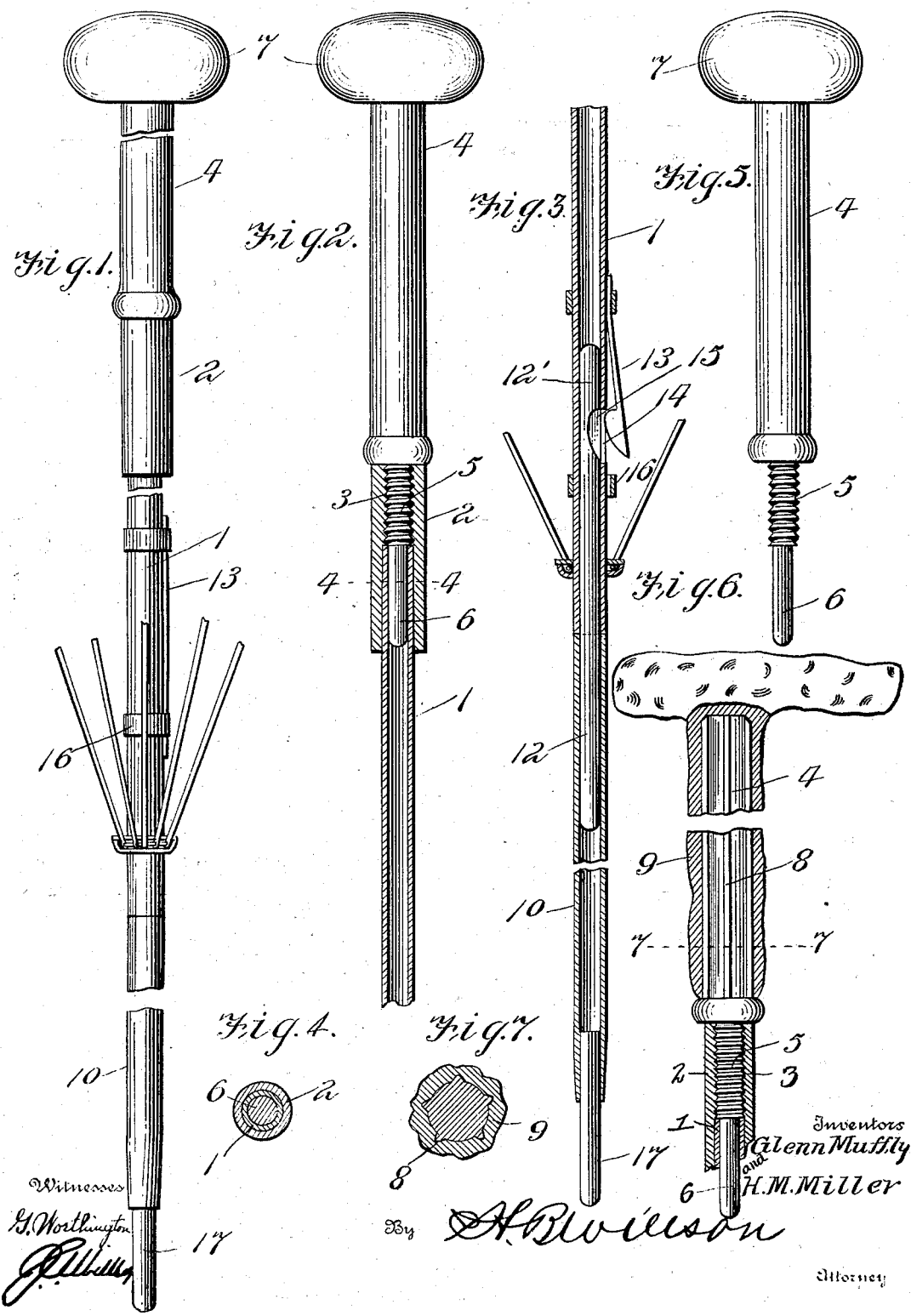

UNITED STATES PATENT OFFICE.

GLENN MUFFLY, OF CHICAGO, ILLINOIS, AND HARRY MAYNARD MILLER, OF COUNCIL BLUFFS, IOWA.

UMBRELLA HANDLE AND ROD.

SPECIFICATION forming part of Letters Patent No. 752,849, dated February 23, 1904.

Application filed April 30, 1903. Serial No. 155,003. (No model.)

*To all whom it may concern:*

Be it known that we, GLENN MUFFLY, residing at Chicago, in the county of Cook and State of Illinois, and HARRY MAYNARD MILLER, residing at Council Bluffs, in the county of Pottawattamie and State of Iowa, citizens of the United States, have invented certain new and useful Improvements in Umbrella Handles and Rods; and we do declare the following to be a full, clear, and exact description of the invention, such as will enable others skilled in the art to which it appertains to make and use the same.

This invention relates to improvements in umbrella handles and rods.

The object of the invention is to provide a handle and rod for umbrellas and the like which is composed of sections which may be quickly separated to facilitate the packing of the same and easily joined together again for use.

A further object is to provide such a handle and rod which will be simple, strong, and durable and which will possess many advantages over the common form of umbrella handles and rods.

With these and other objects in view the invention consists of certain novel features of construction, combination, and arrangement of parts, as will be more fully described, and particularly pointed out in the appended claims.

Figure 1 is a side view of an umbrella handle and rod embodying the invention. Fig. 2 is an enlarged longitudinal sectional view through the handle end of the rod. Fig. 4 is a similar view through the tip end of the same. Fig. 3 is a cross-sectional view on the line 4 4 of Fig. 2. Fig. 5 is a detail view of the handle detached. Fig. 6 is a sectional view through a modified form of handle. Fig. 7 is a cross-sectional view on the line 7 7 of Fig. 6.

In the drawings, 1 denotes the main body of the rod, which is preferably hollow or tubular. On the handle end of the rod is brazed or otherwise fixed a sleeve or ferrule 2, forming a socket, which end is interiorly screw-threaded, as at 3.

4 denotes the handle, which may be constructed of any suitable material, though preferably formed of metal. On the inner end of the handle is formed a reduced threaded shank 5, the end of the shank being further reduced to form a smooth pin or tenon 6. The handle 4 may be finished off and provided with a knob 7, as shown in Figs. 1, 2, and 5, or it may be formed as shown in Figs. 6 and 7, having the knob 7 left off and provided along its length with a series of longitudinally-disposed radially-projecting ribs or projections 8. In this form the handle 4 is adapted to receive a supplemental handle 9, of natural wood or other material, in the bore of which is inserted and wedged the handle 4, the ribs 8 serving to assist in holding the two handles together and prevent turning of one upon the other.

10 denotes the tip end or section of the rod, which is formed separate from and detachably connected to the main body of the rod in the following manner: In the inner end of the tip end or section 10 is brazed or otherwise fixed one end of a connecting-bar 12, the opposite end forming a tongue 12', which is adapted to be inserted in the end of the main portion of the rod.

Any suitable means may be employed for holding the tongue 12' of the bar 12 in the end of the rod 1, that shown in the drawings consisting of a spring-catch 13, fixed to the main portion of the rod below the point of attachment of the ribs and cover of the umbrella. The end of the catch is adapted to pass through a slot 14, formed in the side of the portion 1, and to enter a notch or depression 15, formed in the end of the tongue 12'. A band or collar 16 is slidably mounted on the portion 1 of the rod and is adapted to be slipped over the catch 13 after it has been engaged with the notch 15 to hold the same in place.

The inner end of the tongue 12' is beveled or rounded off to facilitate its insertion in the end of the section 1. In the outer end of the section 10 is secured the usual steel tip 17.

When it is desired to take down or reduce the size of the umbrella for packing or other purposes, the same is first partly raised and the ring or band 16 slipped off the catch 13, when the same will fly out of engagement with the notch 15, thus permitting the tip end of the rod to be removed. The umbrella is now closed and the handle unscrewed from the opposite end of the main section. The umbrella is now of such length as to be readily packed in a trunk or valise or packed closely for shipping. A further advantage derived from a detachable handle of this character is that a dealer is able to change the handles of the umbrellas to suit the fancy of a customer.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim, and desire to secure by Letters Patent, is—

1. The combination with an umbrella-rod, provided on the handle end thereof with a tubular interiorly-threaded socket, of a handle having a threaded shank adapted to be screwed into said threaded socket, and formed with laterally-disposed radial ribs, and a supplemental handle having a radially-recessed bore in which the said ribbed handle is received, substantially as described.

2. The combination, in an umbrella-rod, of a main section, a tip-section provided on its inner end with a tongue having a notch or recess formed therein, said tongue being adapted to be inserted in said main section, a spring-catch carried by the main section and adapted to engage said notch and hold said tongue in place, and means for holding said catch in engagement with said notch, substantially as described.

3. The combination, in an umbrella-rod, of a main section, a tip-section provided with a tongue entering the main section and having a notch formed therein, a spring-catch carried by the main section and adapted to enter the same and engage said notch, and a sliding retainer on said main section to engage said catch and hold it in engagement with the notch.

4. The combination, in an umbrella-rod, of a main section, a tip-section provided at its inner end with a tongue having a notch or recess formed therein, said tongue adapted to be inserted in the main section, a spring-catch carried by the main section and adapted to enter the same and engage said notch to hold the tongue in place, and a sliding sleeve for holding the tongue in engagement with the notch, substantially as described.

In testimony whereof we have hereunto set our hands in presence of two subscribing witnesses.

GLENN MUFFLY.
HARRY MAYNARD MILLER.

Witnesses to the signature of Glenn Muffly:
   ALFRED L. FRASER,
   JULIA B. SNYDER.

Witnesses to signature of H. M. Miller:
   E. S. McCORD,
   H. E. SLATTERY.